US 9,079,275 B2

(12) United States Patent
Ota et al.

(10) Patent No.: US 9,079,275 B2
(45) Date of Patent: Jul. 14, 2015

(54) AUTOMATIC SCREW TIGHTENING APPARATUS

(75) Inventors: Yoshitake Ota, Iwate (JP); Hiroshi Takahashi, Iwate (JP)

(73) Assignee: OHTAKE ROOT KOGYO CO., LTD., Iwate (JP)

( * ) Notice: Subject to any disclaimer, the term of this patent is extended or adjusted under 35 U.S.C. 154(b) by 1130 days.

(21) Appl. No.: 13/048,381

(22) Filed: Mar. 15, 2011

(65) Prior Publication Data

US 2011/0252927 A1    Oct. 20, 2011

(30) Foreign Application Priority Data

Apr. 19, 2010   (JP) ................................. 2010-096251

(51) Int. Cl.
*B25B 23/04* (2006.01)
*B23P 19/00* (2006.01)
*B23P 19/06* (2006.01)

(52) U.S. Cl.
CPC ............. *B23P 19/005* (2013.01); *B23P 19/006* (2013.01); *B23P 19/06* (2013.01)

(58) Field of Classification Search
CPC ...... B25B 23/04; B25B 23/065; B25B 23/10; B23P 19/006; B23P 19/06
USPC .................. 81/430, 431, 57.37; 227/112, 139
See application file for complete search history.

(56) References Cited

U.S. PATENT DOCUMENTS

| 2,689,589 A * | 9/1954 | Allen et al. ................... 81/57.37 |
| 4,815,343 A * | 3/1989 | Sofinowski ................... 81/57.37 |
| 2008/0247844 A1* | 10/2008 | Hartrampf et al. ................ 414/4 |

FOREIGN PATENT DOCUMENTS

| JP | 09-058847 | 3/1997 |
| JP | 2001-287827 | 10/2001 |

* cited by examiner

*Primary Examiner* — Monica Carter
*Assistant Examiner* — Melanie Alexander
(74) *Attorney, Agent, or Firm* — Dilworth & Barrese, LLP.

(57) ABSTRACT

An automatic screw tightening apparatus suppresses damage of an inner wall of a transfer tube, stabilizes the posture of the screw, stably supplies the screw to a driver bit, and reduces screw tightening time. A rotatable arm is installed at the screw discharging unit and a feed head unit is installed at a fore end of the rotatable arm to be brought into close contact with a driver bit portion of a fore end of the screw tightening mechanism. The feed head unit is movable between close contact with the driver bit portion and an evacuation position where the feed head unit is far from the driver bit unit. At the close contact position, the driver bit portion of the fore end of the screw tightening mechanism is brought into contact with the screw and sucks a head portion of the screw to engage the screw.

13 Claims, 17 Drawing Sheets

FIG. 7
(a)
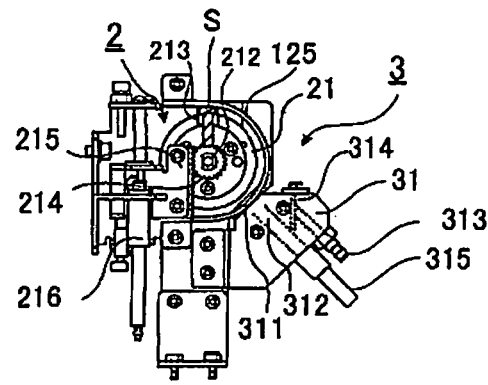
(b)
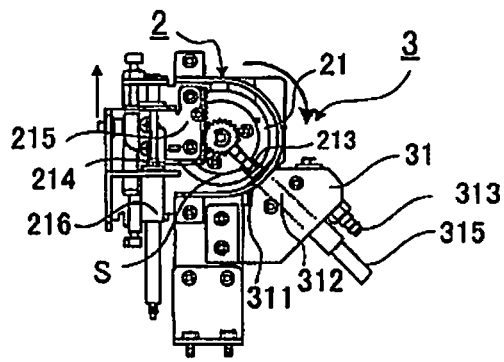
(c)
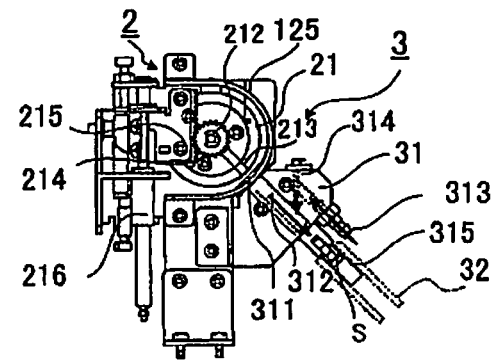
(d)
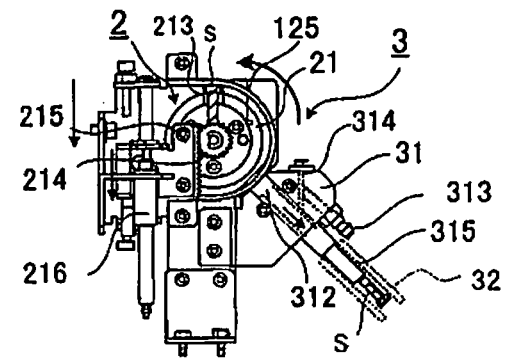

[FIG. 19]

AUTOMATIC SCREW TIGHTENING APPARATUS

BACKGROUND OF THE INVENTION

1. Technical Field

The present invention relates to an automatic screw tightening apparatus which automatically tightens a screw against a predetermined screwed portion of a subject by a screw tightening mechanism.

2. Related Art

In an automatic screw tightening apparatus according to the related art for automatically tightening a screw against a predetermined screwed portion of a subject by a screw tightening mechanism as disclosed in Japanese Patent Application Laid-Open No. Hei8-229752, predetermined screws are automatically fed from a screw feeding mechanism to a screw tightening head of a fore end of the screw tightening mechanism one by one. Then, the subject is fixed to a movable table and the screwed position of the subject moves to a predetermined position while the screw tightening head of the screw tightening mechanism moves. Next, the screw is tightened to assemble the subject.

In this case, screws are fed to the screw tightening mechanism through a feeder hose. However, there are disadvantages as follows. For example, tips of screws often get stuck in the hose. Further, since the screw feeding mechanism should move with the feeder hose attached to the screw tightening head, the screw feeding mechanism is large. Furthermore, since the moving range of the screw tightening mechanism should be wide, the screw tightening apparatus is disadvantageous in space. Moreover, unexpected accidents may happen due to contact of workers or subjects with the hose or others.

Meanwhile, screw tightening mechanisms in which a driver bit unit sucks air from a gap between a driver bit (BIT) and a screw holder so as to engage a screw with the driver bit and hold the screw are disclosed in Japanese Patent Application Laid-Open No. Hei8-229752, Japanese Patent Application No. 2010-29559 filed previously by the applicant of the present application, etc.

SUMMARY OF THE INVENTION

The present invention has been made considering the above-mentioned problems and is to provide an automatic screw tightening apparatus for automatically tightening a screw against a predetermined screwed portion of a subject by a screw tightening mechanism in which smooth and automatic assembling is possible, a fore end portion of the screw tightening mechanism smoothly moves up and down without being connected to a hose or others, the screw tightening mechanism is small-sized and compact, and the moving range of the screw tightening mechanism is reduced.

In order to achieve the above-mentioned object, according to an embodiment of the invention, there is provided an automatic screw tightening apparatus that transfers a screw from a screw feeding mechanism to a screw tightening mechanism by a screw transferring mechanism using air suction of the screw tightening mechanism, engages the screw with a driver bit portion of a fore end of the screw tightening mechanism, and tightens the screw against a desired screwed portion. In the screw tightening apparatus, a discharging unit is provided at a fore end of the transfer tube of the screw feeding mechanism, a rotatable arm is installed at the discharging unit and a feed head unit is installed at a fore end of the rotatable arm to be brought into close contact with a driver bit portion of a fore end of the screw tightening mechanism, the feed head unit is movable between a close contact position where the feed head unit is in close contact with the driver bit portion of the fore end of the screw tightening mechanism and an evacuation position where the feed head unit is far from the driver bit unit, and at the close contact position, the driver bit portion of the fore end of the screw tightening mechanism is brought into contact with the screw and sucks a head portion of the screw so as to be engaged with the screw.

In the automatic screw tightening apparatus, a plurality of feed head parts corresponding to a plurality of different kinds of screws are provided at the feed head unit of the fore end of the rotatable arm, and a predetermined feed head part is selected and is brought into contact with the driver bit portion such that the different kinds of screws can be fed to the driver bit unit.

In the automatic screw tightening apparatus, a bent passage of each of the feed head part is formed by forming bent guide grooves for guiding the screws in matching surfaces of splittable guide block components to form a screw guide passage.

According to the automatic screw tightening apparatus of the embodiment of the present invention, since screws are transferred with the head portions of the screws being in the lead by the screw transferring mechanism using air suction from the screw feeding mechanism, the inner wall of the transfer tube is less damaged, the screws do not get stuck in the transfer tube, and it is possible to stabilize the posture of the screws, to firmly engage the screws with the driver bit, to stably feeding the screws to a driver, and to improve reliability.

Further, it is possible to automatically and quickly tighten the screw engaged with the driver bit against the screwed portion of the subject. Furthermore, a configuration for engagement of the screw with the driver bit is simple, maintenance is easy, and the fabrication cost is low.

According to the automatic screw tightening apparatus of the embodiment of the present invention, since a plurality of the feed head parts corresponding to various different kinds of screws are provided at the fore end of the rotatable arm, it is possible to quickly engage the various different kinds of screws with the driver bit, and since it is possible to supply a desired kind of screws to the feed head units only by controlling the rotation position of the feed head unit, the configuration is simple and maintenance is easy.

According to the automatic screw tightening apparatus of the embodiment of the present invention, since bent guide grooves for guiding the screws are formed in the matching surfaces of splittable guide block components, a design can be freely made such that the cross-section of the screw guide passage has an uniform true circle shape over the screw guide passage formed by the guide grooves or has a slightly larger true circle shape only in a bent section if necessary, unlike the related art in which a curved portion of the tube path is flattened.

Figure 5:
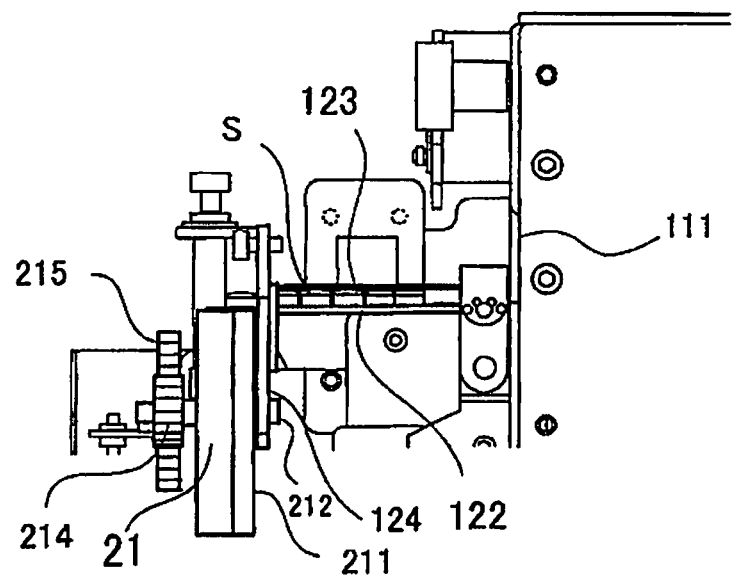
FIG. 5 is a partial right-side view illustrating the screw discharging unit of FIG. 4.
Figure 6:
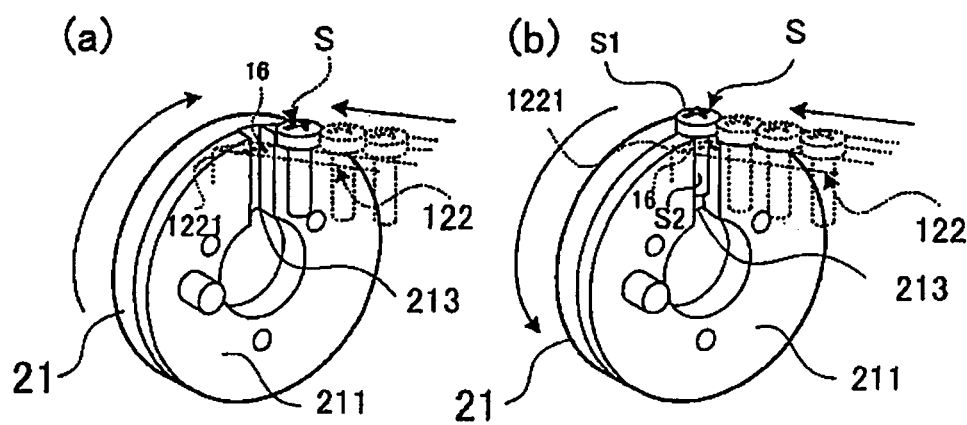

(a) and (b) of FIG. 6 are enlarged perspective views explaining an operation of a screw bringing disk of FIG. 5.

(a) to (d) of FIG. 7 are enlarged perspective views explaining operations of the screw discharging unit and the screw transferring mechanism.

Figure 8:
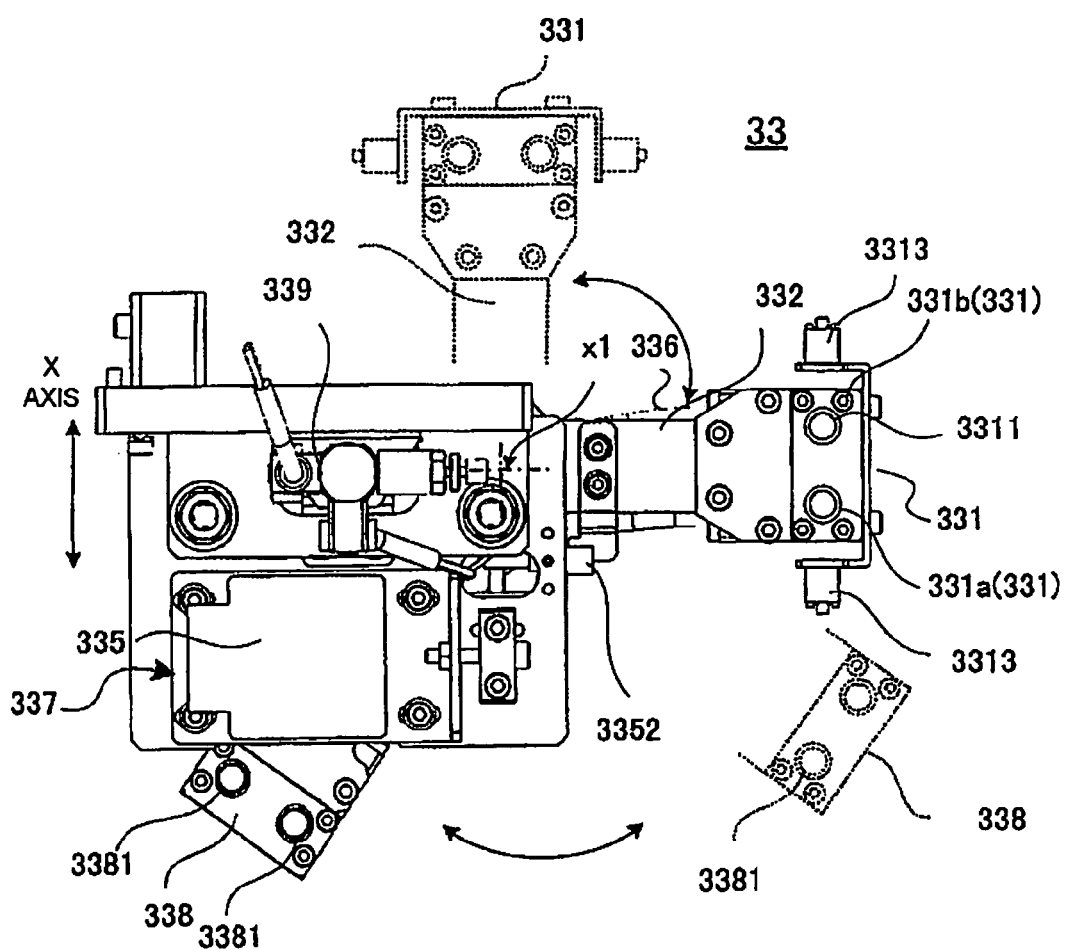

FIG. 8 is a plan view illustrating a discharging unit 33 of the embodiment of the present invention as seen from above.

Figure 9:
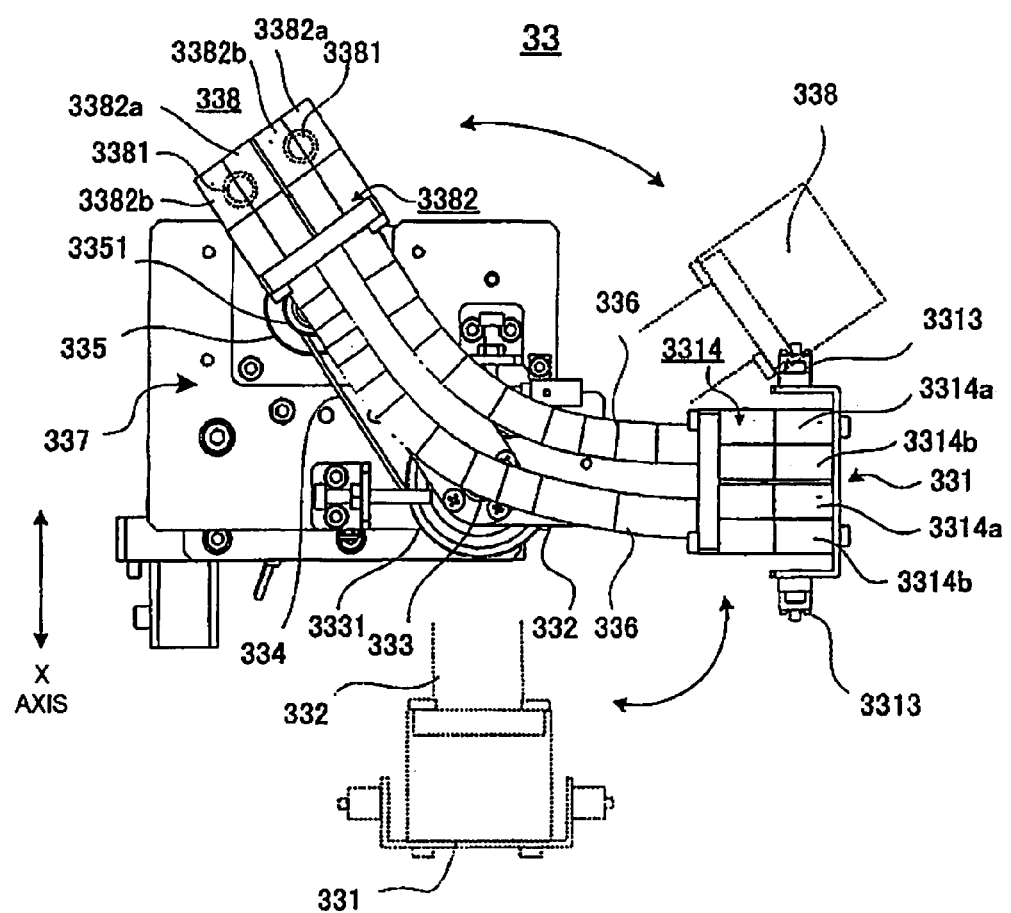

FIG. 9 is a bottom view illustrating the discharging unit of FIG. 8.

Figure 10:
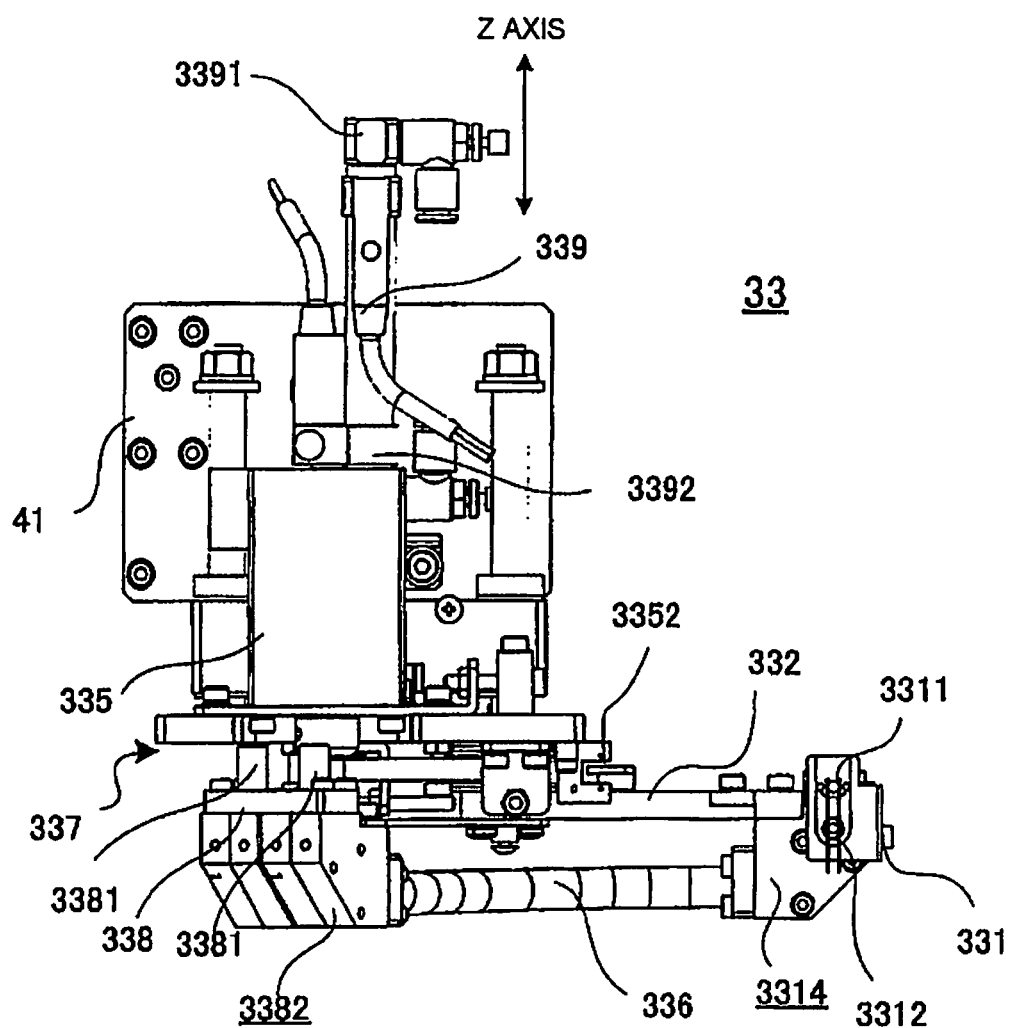

FIG. 10 is a left side view illustrating the discharging unit of FIG. 8.

Figure 11:
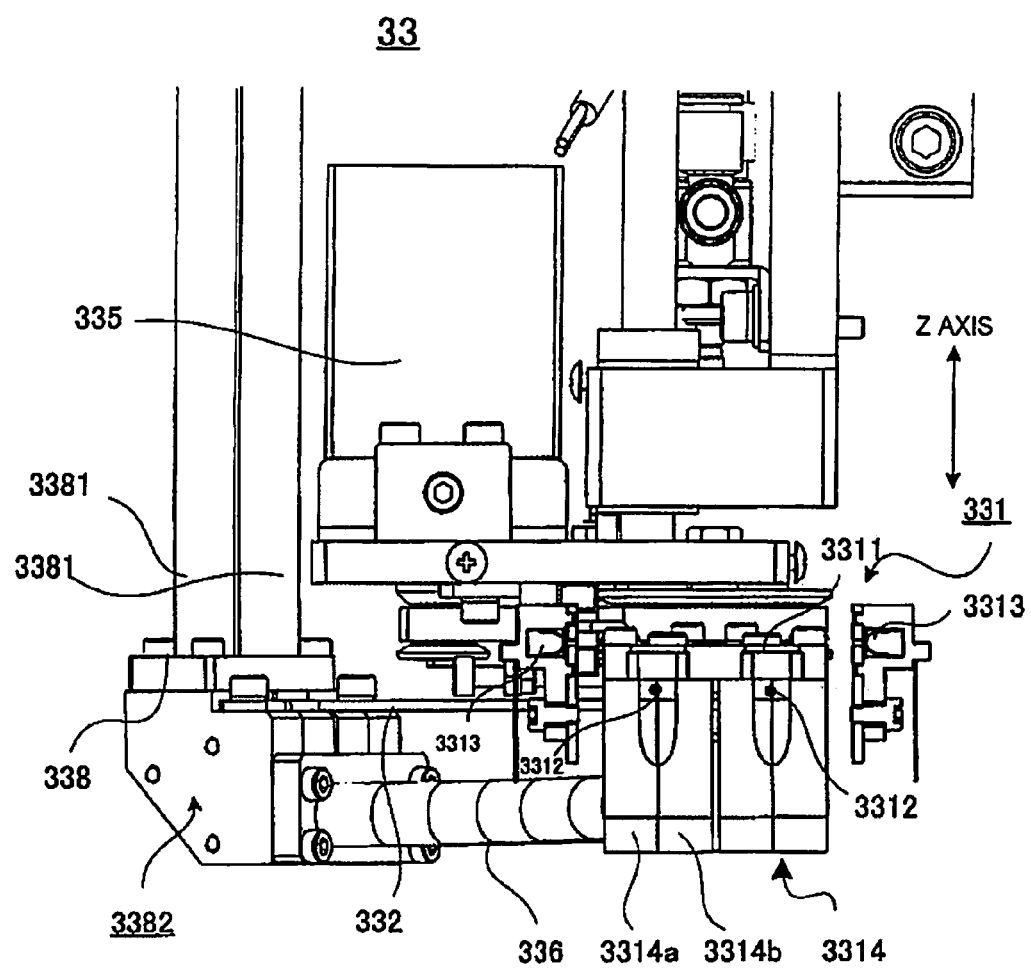

FIG. 11 is a front view illustrating a partial cross section of the discharging unit of FIG. 8.

Figure 12:
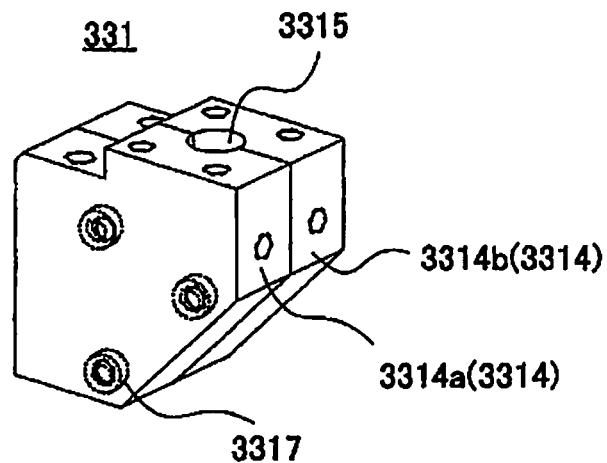

FIG. 12 is a perspective view illustrating guide block components of a feed head unit of the embodiment of the present invention.

Figure 13:
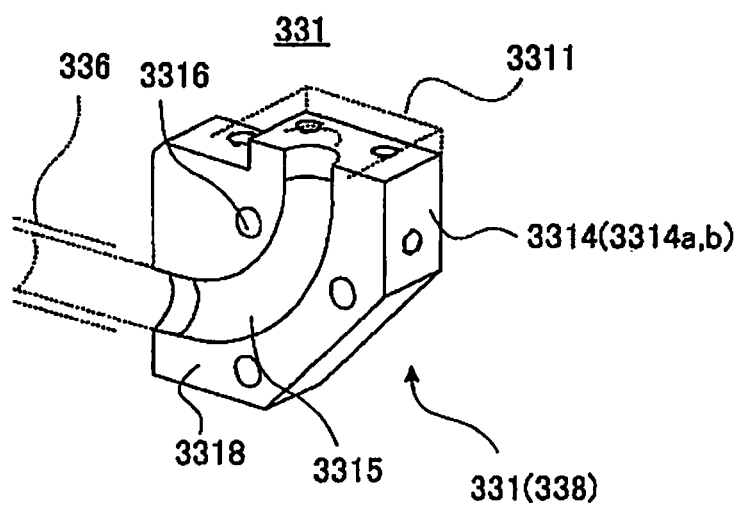

FIG. 13 is an exploded perspective view illustrating a guide block component of FIG. 12.

Figure 14:
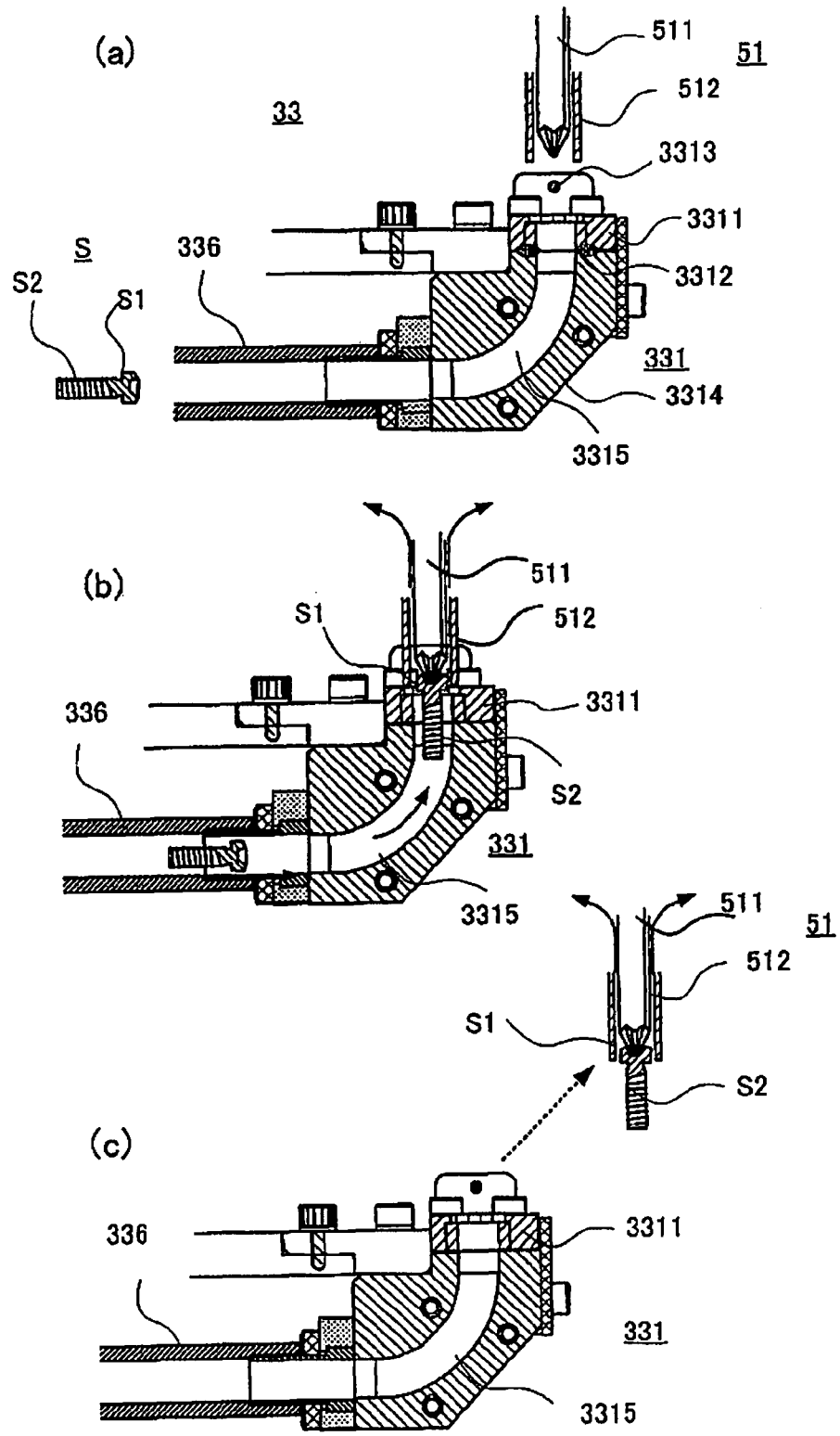

FIG. 14 is an explanatory view explaining an operation of engaging a screw with a driver bit (BIT) in the embodiment of the present invention.

Figure 15:
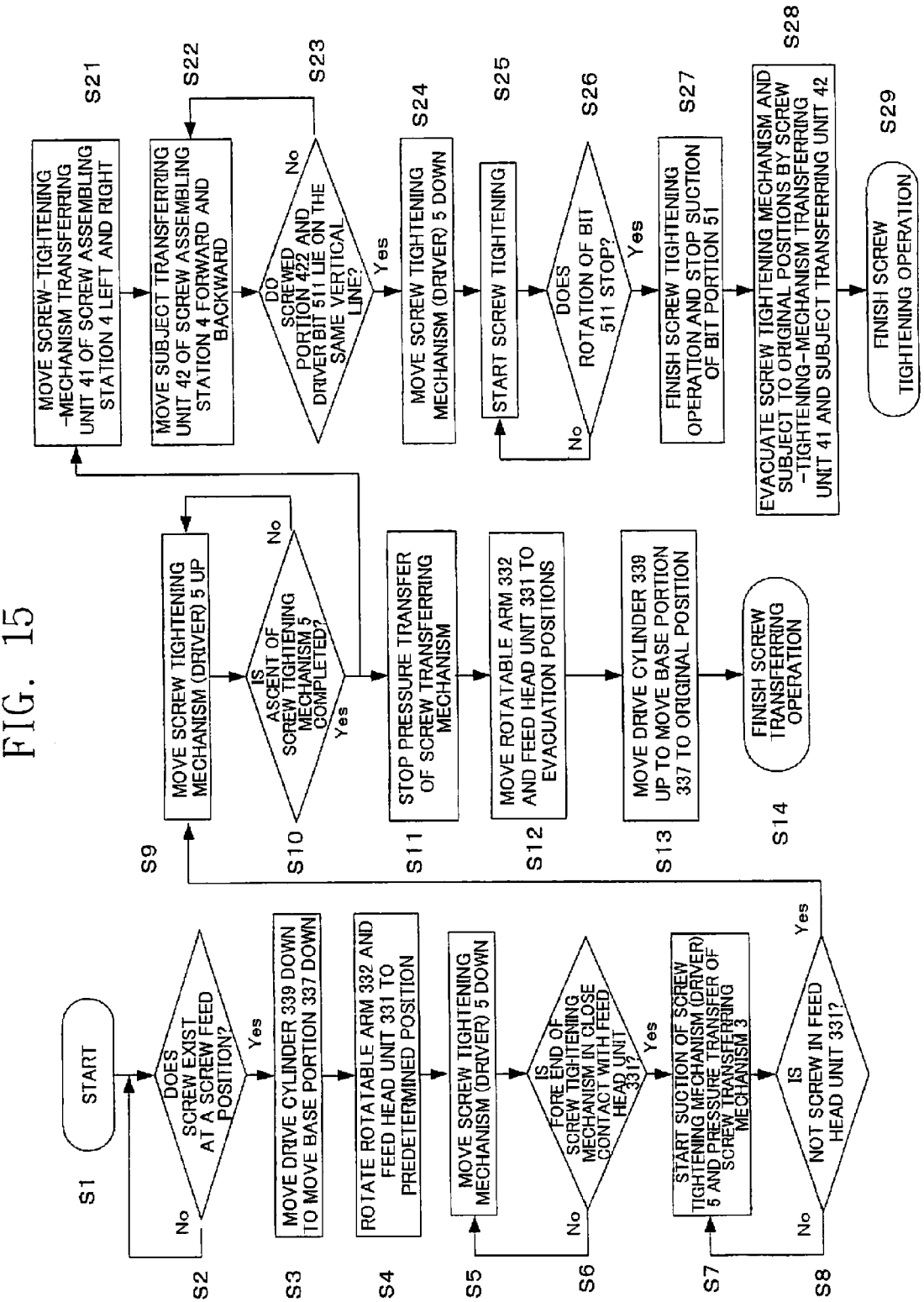

FIG. 15 is a flow chart illustrating the embodiment.

Figure 16:
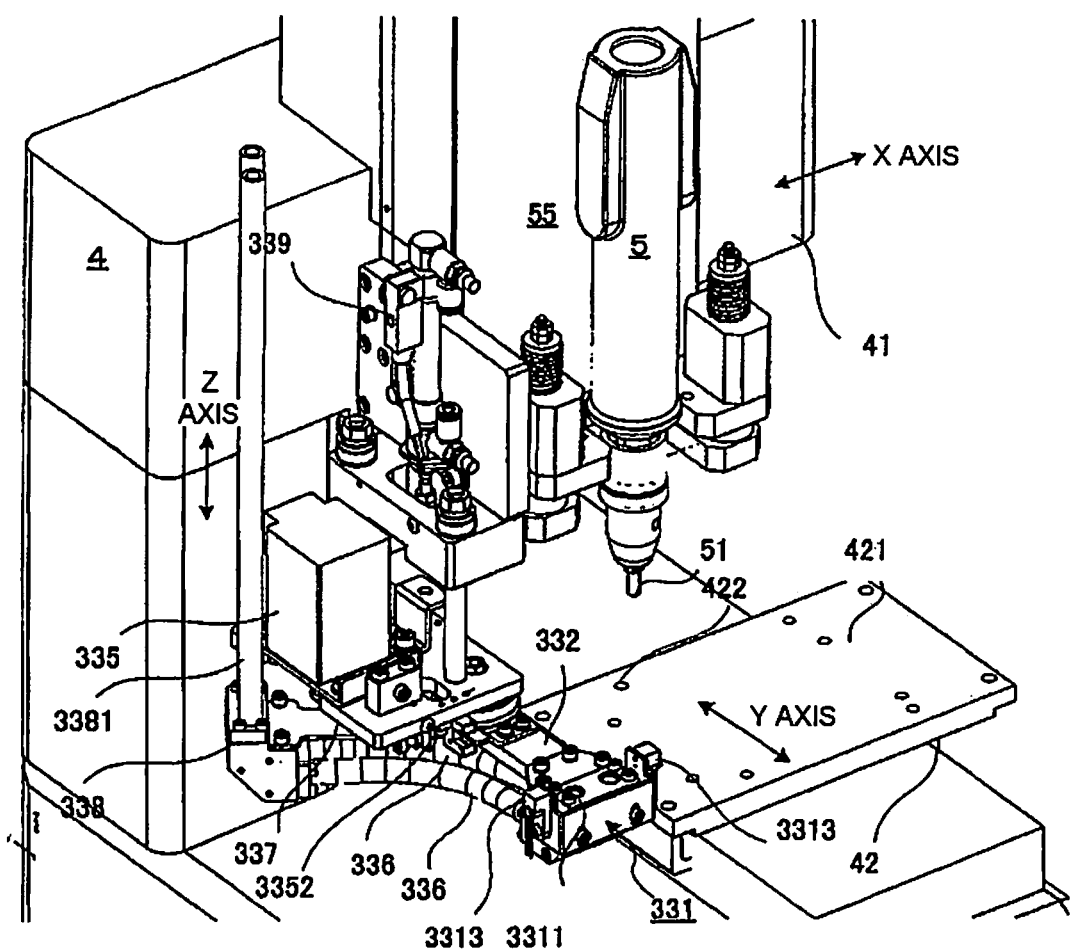

FIG. 16 is a perspective view illustrating a start state of automatic screw feeding manipulation in the embodiment.

Figure 17:
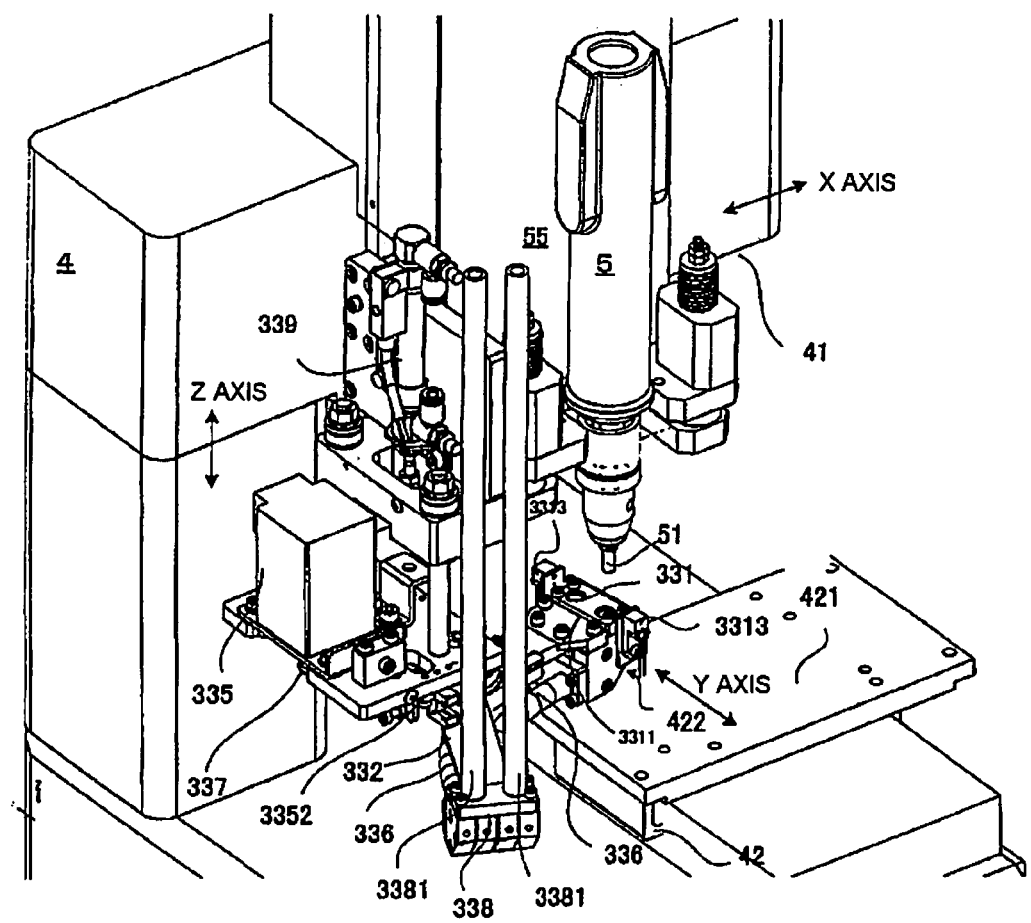

FIG. 17 is a perspective view illustrating a state in which the feed head unit 331 is positioned right below a driver bit portion 51 by moving from the state of FIG. 16.

Figure 18:
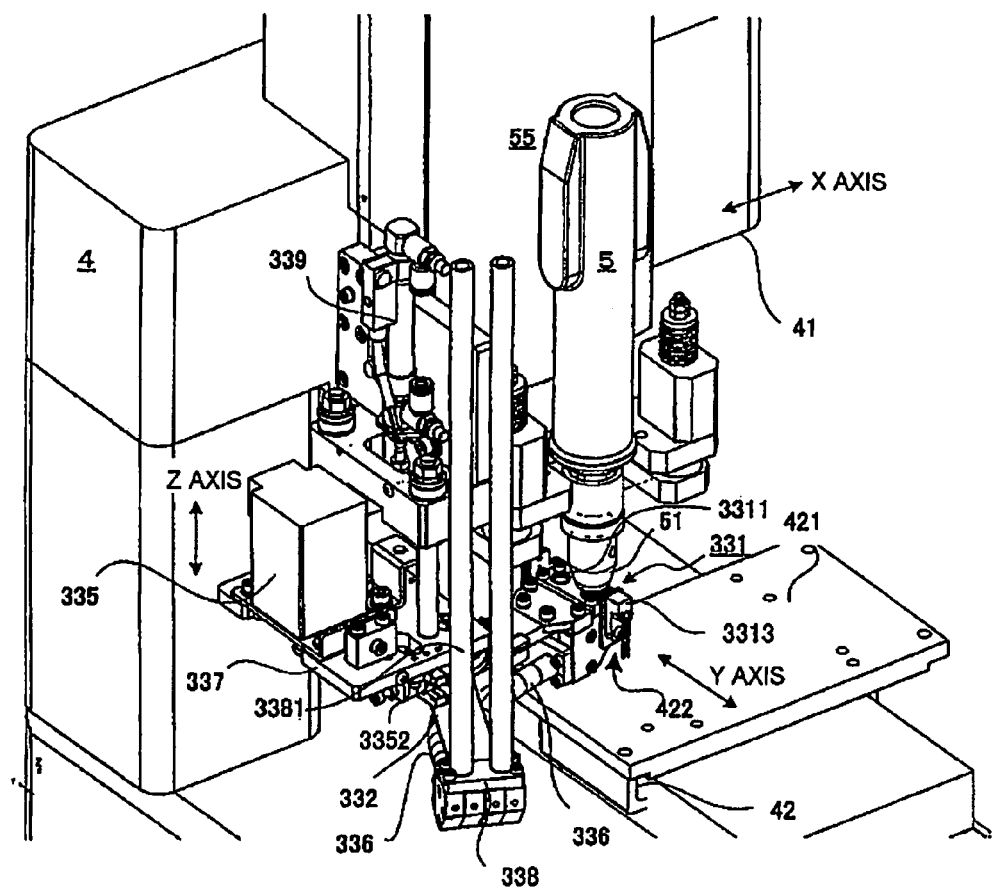

FIG. 18 is a perspective view illustrating a state in which a screw is engaged with a driver bit 511 by moving the driver bit 511 down from the state of FIG. 17.

Figure 19:
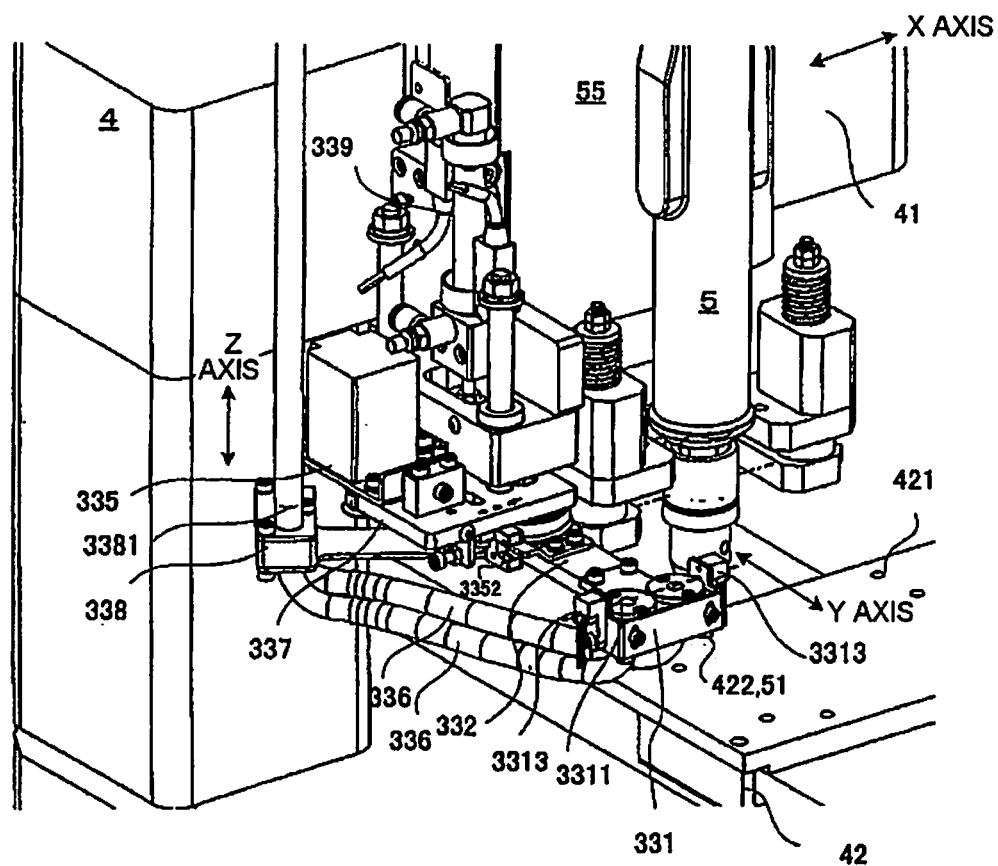

FIG. 19 is a perspective view illustrating an operation state in which the driver bit 511 starts a screw tightening operation.

Figure 20:
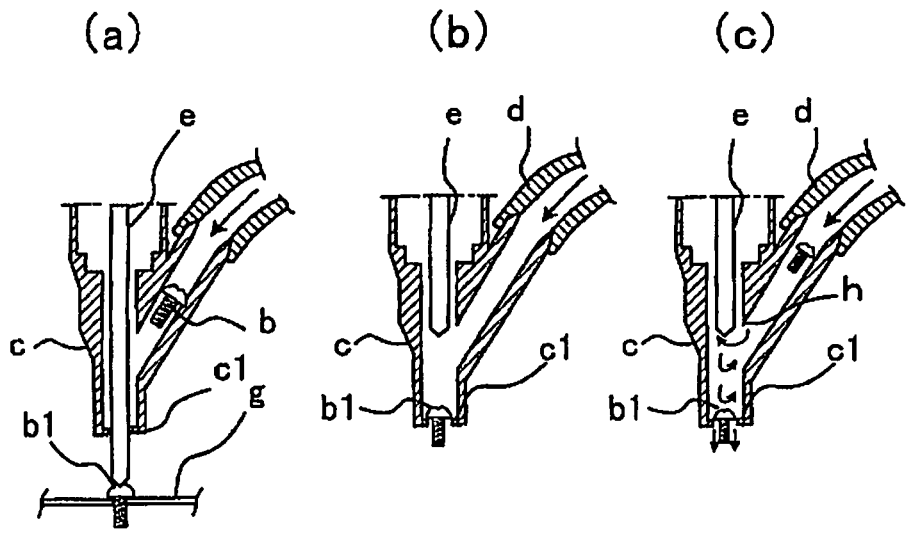

FIG. 20 is a cross-sectional view of an automatic screw tightening apparatus according to the related art.

Figure 21:
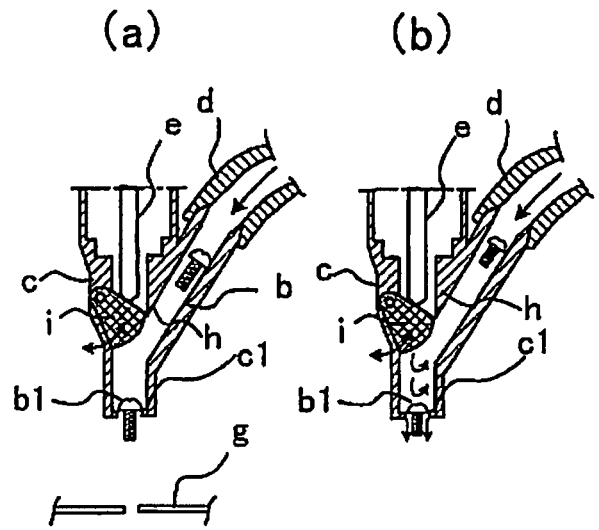

FIG. 21 is a cross-sectional view of another automatic screw tightening apparatus according to the related art.

DESCRIPTION OF EXEMPLARY EMBODIMENT

An embodiment of the present invention transfers screws one by one from a screw feeding mechanism to a screw tightening mechanism (driver) through a transfer tube such as a vinyl tube or hose with the head portions of the screws being in the lead in the transfer tube, and engages the head portion of each of the transferred screws with a fore end of a driver bit portion of the screw tightening mechanism by air suction of the screw tightening mechanism, thereby automatically and consecutively tightening the screws against desired screwed portions.

Hereinafter, an automatic screw tightening apparatus according to an embodiment of the present invention will be described in detail with reference to the accompanying drawings.

[Whole Configuration]

An automatic screw tightening apparatus according to an embodiment of the present invention with a screw feeding mechanism will be wholly and schematically described with reference to FIG. 1.

This embodiment is a kind of robot. According to this embodiment, two screw feeding mechanisms 1 are disposed. The screw feeding mechanisms 1 transfer screws to a horizontally movable feed head unit 331 of a screw assembling station 4 through transfer tubes 32 of screw transferring mechanisms 3. Then, a vertically movable screw tightening mechanism 5 installed at the screw assembling station 4 moves down such that a driver bit (BIT) portion 51 of a fore end of the screw tightening mechanism 5 is in contact with a screw in the feed head unit 331. In this state, the driver bit portion 51 sucks the head portion of the screw to be engaged with the head portion. Thereafter, while the screw tightening mechanism 5 moves up, a subject 421 such as a camera or a cellular phone moves forward or backward such that a predetermined screwed portion 422 of the subject 421 and the driver bit portion 51 lie on the same vertical line. Next, the screw is tightened.

[Screw Feeding Mechanism 1]

First, the screw feeding mechanism 1 will be described with reference to FIGS. 2 to 6.

Figure 2:
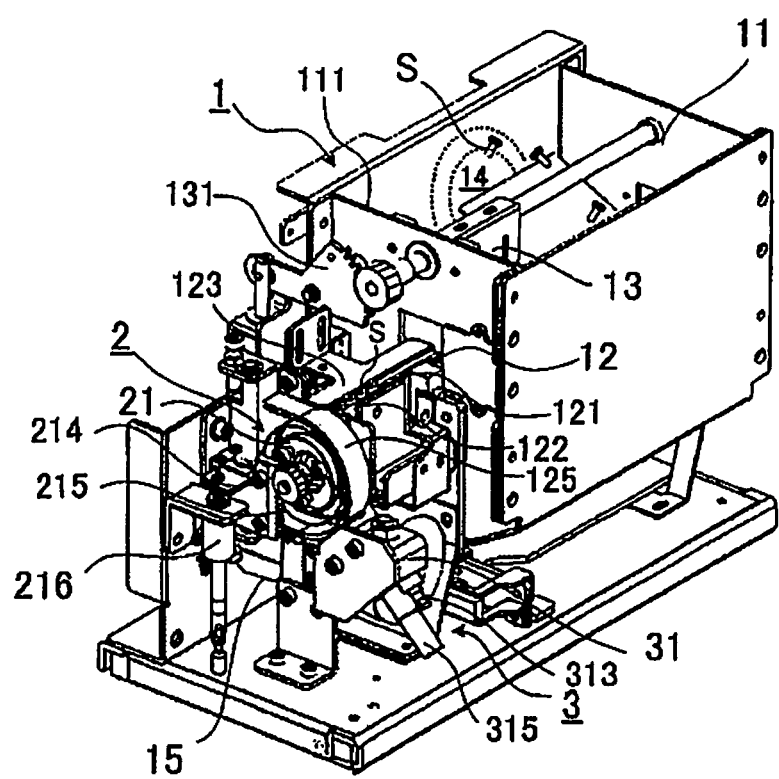
FIG. 2 is a perspective view illustrating an appearance of a screw feeding mechanism 1 of FIG. 1.
Figure 3:
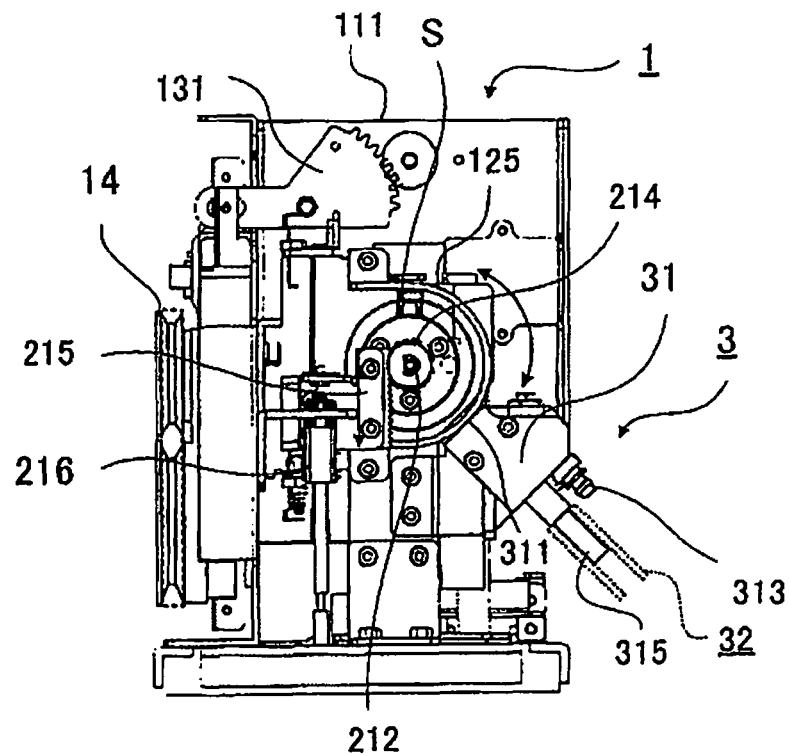
FIG. 3 is a front view illustrating the screw feeding mechanism of FIG. 2.

FIG. 2 is a perspective view of the screw feeding mechanism 1 without an outer frame, and FIG. 3 is a front view of the screw feeding mechanism of FIG. 2. As shown in FIG. 2, screws S are stored in a screw storing unit 11 of the screw feeding mechanism 1, and the stored screws S are aligned and sequentially move to a front surface by a guide rail 12 protruding from a front casing board 111 of the screw storing unit 11 and an aligned-screw guide 122 installed at a fore-end portion 121 of the guide rail 12.

A mechanism to the screw aligning mechanism may be a well-known mechanism. In this embodiment, the guide rail 12 is vibrated such that the screws S in the screw storing unit 11 advance forward, spare screws S on the guide rail 12 are dropped by an oscillation brush 13, and the dropped screws S are re-induced to the guide rail 12 by a screw scooping unit 14 such as a turning magnetic positioned on a side surface. A brush turning mechanism 131 turns the oscillation brush 13 from side to side. The brush turning mechanism 131 and the screw scooping unit 14 are driven by a transmission mechanism of a drive motor 15 or a pulley or a ring disposed on the front surface of the screw storing unit 11.

[Screw Discharging Unit 2]

Figure 4:
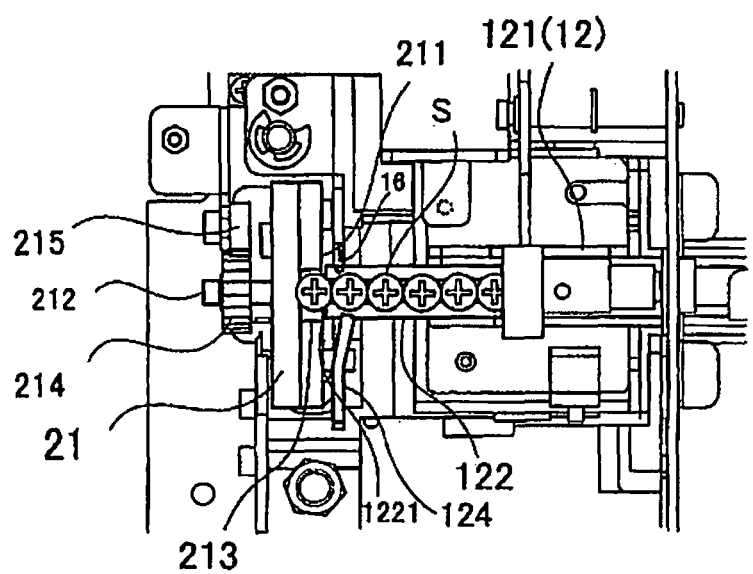
FIG. 4 is a plan view illustrating a screw discharging unit of FIG. 2 as seen from above a screw transferring unit.

Further, as shown in FIGS. 4 and 5, a screw aligning cover 123 is provided on the aligned-screw guide 122, and a screw discharging unit 2 is disposed to induce the screws S such that, in the next process, the screw head portion S1 of the screws S are located in the lead in the movement direction of the screws S in a movement tube 32 of a screw transferring mechanism 3. The screw discharging unit 2 is disposed to be in contact with a guide fore-end surface 1221 of the aligned-screw guide 122 as shown in a top view of FIG. 4 and a left side view of FIG. 5.

The screw discharging unit 2 performs a preparation process for the screw transferring mechanism 3 to be described below and may be configured as a part of the screw transferring mechanism 3. A main component of the screw discharging unit 2 is a screw bringing disk 21 (see FIG. 6) which takes out the screws S on the aligned-screw guide 122 one by one by turning clockwise and counterclockwise. The screw bringing disk 21 turns clockwise and counterclockwise around a rotation shaft 212. A rotation surface 211 of the screw bringing disk 21 is provided at a right angle to the screw movement direction of the aligned-screw guide 122 of the screw feeding mechanism 1, and a screw receiving groove 213 is provided in the rotation surface 211 of the screw bringing disk 21. The screw receiving groove 213 is a groove which corresponds to the posture of the screws S fed from the aligned-screw guide 122 and has a width slightly greater than the diameter of the thread parts S2 of the screws S.

Further, on the opposite side of the screw bringing disk 21 to the side where the aligned-screw guide 122 is disposed, a drive gear 214 is fixed. The gear 214 is engaged with a rack 215 moving up and down. The vertical movement of the rack 215 is hydraulically controlled by a drive cylinder 216 according to a control command device (not shown), thereby turning the screw bringing disk 21 clockwise and counterclockwise.

[Screw Transferring Mechanism 3]

Next, the operation of the screw transferring mechanism 3 will be described together with the configuration of the screw bringing disk 21 constituting part of the screw transferring mechanism 3 with reference to (a) to (d) of FIG. 7.

As shown in (a) of FIG. 7, in order to prevent a screw from dropping when the screw is fitted into the screw receiving groove 213 of the screw bringing disk 21 and the screw bringing disk 21 turns clockwise in the drawing, a side screw guide 129 (see FIG. 4) is provided on the screw feeding mechanism 1 side and a screw top guide 125 is provided along the outer circumference of the screw bringing disk 21 on the screw head portion side. In (a) of FIG. 7, the screw bringing disk 21 stands still in a state in which a screw is fitted into the screw bringing disk 21.

Next, as shown in (b) of FIG. 7, according to a turn command of the control command device (not shown), the drive cylinder 216 is extended, the rack 215 moves upward, and the gear 214 and the screw bringing disk 21 turn clockwise about 135° and then stop.

Here, a chute block 31 of the screw transferring mechanism 3 is fixed to the screw feeding mechanism 1 to be close to the screw discharging unit 2, and a tube connection portion 315 of the chute block 31 is connected to a transfer tube 32 connected to a screw tightening mechanism 4.

In the stop state of the screw bringing disk 21 shown in (b) of FIG. 7, the screw S is at the position of a movement inlet 311 of the transfer mechanism 3 with a screw head portion S1 tilted downward. Subsequently, as shown in (c) of FIG. 7, the screw S1 moves to a screw guide path 312 by the weight of the screw.

Next, compressed air is supplied to a compressed-air inlet 313 provided in the chute block 31 and is discharged from the a nozzle 314 positioned in the upstream of the screw S in the screw guide path 312 according to a command of the control command device (not shown), and at the same time, a suction of the screw tightening mechanism 5 is imposed on the transfer tube 32 according to a command of the control command device (not shown), whereby the screw S induced in the screw guide path 312 with the screw head portion S1 being in the lead is sucked from the feed head unit 331 attached to a discharging unit 33 of a fore end of the transfer tube 32 so as to be transferred to the screw tightening mechanism 5 side. Further, remaining gas of a solenoid valve (not shown) when the drive cylinder 216 is retracted is used as the compressed air supplied to the compressed-air inlet 313, thereby simplifying the structure while improving operation efficiency.

Since the air transfer mechanism using compressed air is a secondary mechanism in the embodiment of the present invention, it may be applied if necessary. As will be described below, the main is absolutely a screw transferring mechanism by air suction of the screw tightening mechanism 5, and screw transfer is performed by a suction action through a gap between the driver bit 511 and a screw holder (protecting tube) 512 in a fore-end part of a driver bit 511. Therefore, in cases where screw transfer using air is sufficiently possible, for example, a case where the transfer tube 32 is short, as long as the transfer tube 32 is opened to the outside, it is unnecessary to supply compressed air.

If the transfer of the screw S is completed, the screw discharging unit 2 should take out the next screw S. To this end, the screw bringing disk 21 turns counterclockwise as shown in (d) of FIG. 7 so as to return to the state as shown in (a) of FIG. 7, and stands by in a state in which the first screw from the aligned-screw guide 122 is fitted in the screw receiving groove 213 of the screw bringing disk 21.

Then, the screw S moves in the transfer tube 32 with the screw head portion S1 being in the lead, and is fed to the screw tightening mechanism 5. Further, a predetermined length of transparent tube may be used as the transfer tube 32. The transparent tube is formed of synthetic resin which has flexibility, has a constant inner diameter, and has an inner wall to which a material to prevent screws from getting stuck in the transfer tube is applied. Needless to say, the inner diameter may vary according to used screws S.

[Discharging Unit 33 and Driver Bit Portion 51]

Here, a discharging unit 33 of a fore end of the transfer tube 32 and the feed head unit 331 that is a major component of the discharging unit 33 will be described with reference to FIGS. 8 to 11. If the feed head unit 331 is brought into normal contact with the driver bit portion 51 of the screw tightening mechanism 5, a screw S is transferred to the screw tightening mechanism 5 side by suction. This will be described in detail.

FIG. 8 is a plan view of the entire discharging unit 33 as seen from above, and FIG. 9 is a bottom surface of the discharging unit as seen from below. The feed head unit 331 includes two feed head parts 331a and 331b to correspond to different kinds of screws having different lengths. The feed head unit 331 is disposed at a fore end portion of a rotatable arm 332. The rotatable arm 332 is configured to rotate on a rotation shaft 333 (a rotation axis x1) which is provided on a base portion 337. The rotatable arm 332 is controlled to rotate and stop at a controlled position, that is, an evacuation position of FIG. 8 or a close position of FIGS. 16 and 17 where the rotatable arm 332 is close to the driver bit portion 511 of the fore end of the screw tightening mechanism 5, by the rotation shaft 333 (see FIG. 9). The rotation shaft 333 is provided with a driven pulley 3331 which rotates by a drive pulley 3351 which is connected to a stepper motor 335 and is connected to the driven pulley 3331 through a belt 334.

Meanwhile, as shown in FIGS. 8 and 11, in the vicinity of the center of the upper portion of each of the feed head parts 331a and 331b of the feed head unit 331, a screw delivery hole 3311 is provided. The lower portion of each screw delivery hole 3311 is connected to one side of a connection pipe 336, and the other side of the connection pipe 336 is connected to a connection unit 3381 of a screw feeding port 338. The connection unit 3381 is connected to the transfer tube 32 from the screw transferring mechanism 3.

The screw feeding port 338 is connected coaxially with the rotatable arm 332 and the rotation shaft 333 provided on the base portion 337 and rotates according to rotation of the rotatable arm 332. The connection units 3381 correspond to the screw feeding mechanisms 1 and are connected to the plurality of transfer tubes 32 from the screw feeding mechanisms 1, respectively.

Further, as shown in the left side view of FIG. 10 and the front view of FIG. 11, the base portion 337 is configured to be vertically movable by a drive cylinder 339. At some members, various sensors are installed such that operation control is possible. First, in the screw delivery holes 3311 of the feed head unit 331, screw existence/nonexistence detecting sensors 3312 are installed for detecting whether a screw is being transferred. In the vicinity of an opening of each of the screw delivery holes 3311, a bit existence/nonexistence detecting sensor 3313 is provided for detecting whether the driver bit of the driver bit portion 51 is in the vicinity of the opening. In the vicinity of the rotation shaft 333, an origin detecting sensor 3352 is installed for detecting an origin of rotation of the stepper motor 335 to always stop the stepper motor 335 at a correct position. In the upper end portion of the drive cylinder 339 for vertically moving the base portion 337, an ascent detecting sensor 3391 is installed, and in the lower end portion of the drive cylinder 339, a descent detecting sensor 3392 is installed.

Here, the axis direction of the passage of the screw delivery hole 3311 provided in the vicinity of the center of the upper portion of the feed head part 331a or 331b of the feed head unit 331 is at an almost right angle (90°) to the axis direction of the passage of the connection pipe 336 connected to the lower portion of the feed head part 331a or 331b of the feed head part unit 331. For this reason, in the feed head unit 331, a structure for changing the passage at a right angle should be prepared. However, in the case of merely bending a general pipe, a bent portion of the pipe is inevitably somewhat flattened and thus screws S often get stuck therein.

Therefore, in this embodiment, as shown in FIGS. 12 and 13, a guide block 3314 is used for freely designing the shape of the passage. The guide block 3314 is splittable into two guide block components 3314a and 3314b, and as shown in FIG. 12, the two guide block components 3314a and 3314b join together by inserting bolts 3317 to block joint holes 1316. One guide block components 3314a (or 3314b) of the guide block 3314 has a shape shown in FIG. 13. In matching surfaces 3318 of the guide block components 3314a and 3314b facing each other when the guide block components 3314a and 3314b join together, bent guide grooves 3315 are formed to be a screw guide passage connecting the screw delivery hole 3311 and the connection pipe 336 when the guide block components 3314a and 3314b join together.

In this case, the bent guide grooves 3315 to be the screw guide passage may be freely cut into the matching surfaces 3318 of the guide block components 3314a and 3314b such that the cross-section of the screw guide passage has an uniform true circle shape over the screw guide passage or has a slightly larger true circle shape only in a bent section if necessary. Therefore, the bent section is not flattened.

Although the bent passage of the guide block 3314 of the feed head unit 331 has been described, a bent passage of the screw feeding port 338 has the same structure. In the screw feeding port 338, each screw guide block 3382 is splittable into two guide block components, that is, left and right guide block components 3382a and 3382b. In the matching surfaces of the guide block components 3382a and 3382b facing each other when the guide block components 3382a and 3382b join together, bent guide grooves 3315 are formed, similar to the guide block 3314. Further, in the feed head unit 331, pairs of guide block components 3381a and 3381b may be provided as many as the kinds of screws.

As described above, the bent passage section of the feed head unit 331 is formed by the splittable guide block components 3314a and 3314b, and the bent guide grooves are formed in the matching surfaces 3318 of the two guide block components 3314a and 3314b for smoothly guiding screws.

Meanwhile, as shown in (a) and (b) of FIG. 14, the driver bit (BIT) portion 51 of the fore end of the screw tightening mechanism (driver) 5 has a structure according to the related art of Japanese Patent Application Laid-Open No. Hei8-229752 or a well-known structure. The driver bit portion 51 sucks air from the gap between the driver bit (BIT) 511 and the screw holder 512 such that the driver bit 511 is engaged with a screw and holds the screw.

Figure 1:
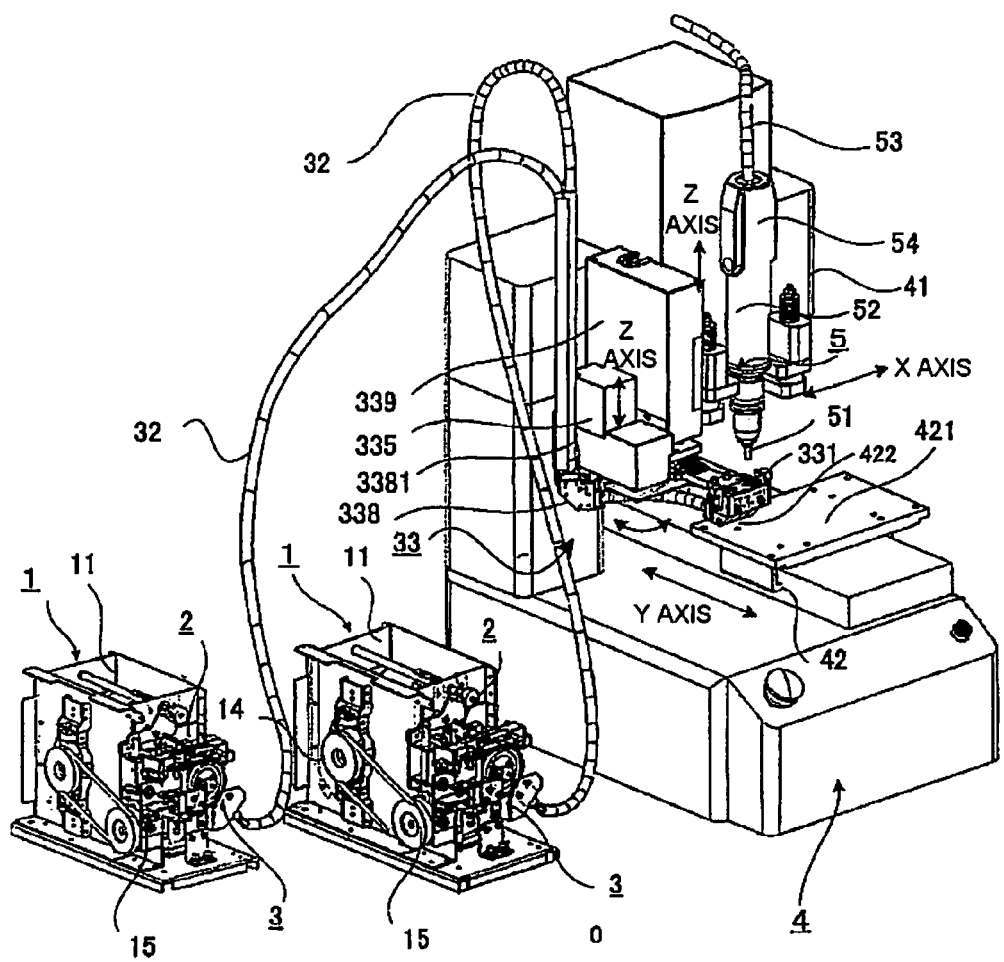
FIG. 1 is a perspective view illustrating an appearance of an automatic screw tightening apparatus according to an embodiment of the present invention.

For the air suction, as shown in FIG. 1, an upper end portion of a main body portion 52 of the screw tightening mechanism 5 is connected to a suction pipe 53 which is connected to a suction apparatus (not shown) controllable by this system.

Further, the screw tightening mechanism (driver) 5 and a driver base portion 54 of the screw tightening mechanism 5 are configured to be vertically movable to a predetermined position by a vertical movement mechanism 55, an ascent-position detecting sensor, and a descent-position detecting sensor which are controlled by the control command device (not shown).

Furthermore, the screw tightening mechanism (driver) 5 and the driver bit portion 51 of the screw tightening mechanism 5 are configured to be movable left and right by a screw-tightening-mechanism transferring unit 41 of the screw assembling station 4, and is provided with a position sensor (not shown) for stopping at a predetermined position.

[Outline of Operation]

An operation in this embodiment described above will be described with reference to a flow chart of FIG. 15 and perspective views of individual states of FIGS. 16 to 19.

First, in step S1, a manipulation button is pressed to send a screw feed command so as to start an automatic screw feeding operation. In step S2, it is sensed whether a screw exists in the aligned-screw guide 122 of the screw feeding mechanism 1 by a screw feed-position (existence/nonexistence) sensor 16 (see FIG. 6) installed at the fore end of the aligned-screw guide 122. If it is sensed that a screw is to be fed is prepared (Yes in the step S2), the procedure proceeds to step S3. In the step S3, the drive cylinder 339 of the discharging unit 33 is activated to move the base portion 337 down in the vertical direction (Z axis). In contrast, if it is sensed in the step S2 that there is no screw (No in the step S2), a screw is fed to the aligned-screw guide 122 of the screw feeding mechanism 1. If there is no screw in the screw storing unit 11, a warning is issued by a warning lamp (not shown), etc. The state of the step S3 is shown in the perspective view of FIG. 16.

Next, the procedure proceeds to step S4. In the step S4, the rotatable arm 332 with two feed head parts 331a and 331b installed at the fore end portion rotates around the rotation shaft 333 of the base portion 337 to position and stop a selected feed head part (any one of the feed head parts 331a and 331b) of the feed head unit 331 right below the driver bit portion 51 of the screw tightening mechanism (driver) 5. The state of the step S4 is shown in the perspective view of FIG. 14, and is the state of (a) of FIG. 14.

At the moment when the rotation of the rotatable arm 332 stops, or during the rotation operation, in the step S4, the screw tightening mechanism 5 and the driver base portion 54 also move down by the vertical movement mechanism 55.

Then, in step S5, the screw tightening mechanism 5 moves down by the vertical movement mechanism 55 such that the driver bit portion 51 of the fore end is in close contact with the feed head part 331a (which is the feed head part in the front side in FIG. 19) (or the feed head part 331b if necessary). Next, in step S6, it is checked whether the axial centers of the screw delivery hole 3311 and the driver bit 511 coincide each other by the bit existence/nonexistence detecting sensor 3313. If the axial centers coincide each other (Yes in the step S6), the procedure proceeds to step S7. In contrast, if the axial centers do not coincide each other (No in the step S6), the procedure returns to the step S5 such that the screw tightening mechanism 5 continues to move down.

In step S7, as shown in (b) of FIG. 14, a suction valve of the suction apparatus on the screw tightening mechanism 5 side is opened to start suction from the suction pipe 53 such that air is sucked from the gap between the driver bit 511 and the screw holder 512. At the same time, compressed air is supplied to the compressed-air inlet 313. As a result, the screw is quickly engaged with the driver bit 511 and sticks thereto by suction. Then, in step S8, it is sensed whether the screw is sucked up to be completely removed the feed head unit 331. If it is sensed that there is no screw in the feed head unit 331 (Yes in the step S8), the procedure proceeds to step S9 in which the screw tightening mechanism 5 moves up. In contrast, if the screw remains in the feed head unit 331 (No in the step S8), the procedure returns to the step S7 to perform an operation of engaging the screw with the driver bit 511. The operation state of the step S7 of engaging the screw with the driver bit 511 is shown in the perspective view of FIG. 18.

In the step S9, as shown in (c) of FIG. 14, the screw tightening mechanism 5 moves up together with the driver base portion 54. Then, in step S10, it is detected whether the screw tightening mechanism 5 reaches an ascent position by the ascent detecting sensor 3391. If it is detected that the screw tightening mechanism 5 reaches the ascent position (Yes in the step S10), the ascent of the screw tightening mechanism 5 stops. In contrast, if the screw tightening mechanism 5 does not reach the ascent position (No in the step S10), the procedure returns to the step S9 in which the screw tightening mechanism 5 continues to move up.

If the ascent of the screw tightening mechanism 5 is completed, an evacuation operation of the rotatable arm 332 is followed in steps S11 to S14 and a screw tightening operation of the screw tightening mechanism 5 is followed in steps S21 to S29.

The evacuation operation of the rotatable arm 332 is performed as follows. First, in step S11, pressure transfer of the screw transferring mechanism 3 by air stops. Next, in step S12, the rotatable arm 332 rotates reversely to move the feed head unit 331 to an original evacuation position. Then, in step S13, the drive cylinder 339 is activated to move the rotatable arm 332 and the base portion 337 up to original positions. In step S14, the screw transferring operation is finished and the screw feeding mechanism 1 waits for the next screw feed command.

Meanwhile, the screw tightening operation follows the step S10. In step S21, the screw tightening mechanism 5 moves left and right (right in this embodiment) by the screw-tightening-mechanism transferring unit 41 of the screw assembling station 4 and stops at a predetermined position set by the control command device. In step S22, a screwed subject 421 of various devices such as cameras or portable phones fixed to a subject transferring unit 42 of the screw assembling station 4 moves forward or backward by the subject transferring unit 42 such that a screwed portion 422 and the driver bit 511 lie on the same vertical line. The step S22 may be performed simultaneously with the step S21.

In step S23, it is checked whether the screwed portion 422 and the driver bit 511 lie on the same vertical line. If the screwed portion 422 and the driver bit 511 do not lie on the same vertical line (No in the step S23), the procedure proceeds to the step S22. If the screwed portion 422 and the driver bit 511 lie on the same vertical line (Yes in the step S23), in step S24, the vertical movement mechanism 55 is activated by the screw tightening mechanism 5 and operates in cooperation with the descent-position detecting sensor, so as to set the driver bit 511 engaged with the screw at a set position. Next, in step S25, the driver bit (BIT) 511 rotates to start a screw tightening operation.

FIG. 19 is a perspective view illustrating a state in which the rotatable arm 332 and the base portion 337 have moved up and evacuated to the original positions by activating the drive cylinder 339 in the step S13, and an operation state in which the screw operation has started by rotating the driver bit (BIT) 511 in the step 25.

Next, in step S26, it is sensed whether the rotation of the driver bit 511 stops. If the rotation of the driver bit 511 stops, in step S27, the screw tightening operation is finished, and at the same time, the suction to the driver bit 511 stops. In contrast, if the rotation of the driver bit 511 continues, the procedure returns to the step S25.

After the step S27, in step S28, the screw tightening mechanism 5 moves left or right (left in this embodiment) by the screw-tightening-mechanism transferring unit 41 of the screw assembling station 4, and the subject 421 moves to a predetermined position set by the control command device. Then, in step S29, the screw tightening operation is finished.

Subsequently, the steps S1 to S29 of the above-mentioned automatic screw tightening operation may be repeated to assembly predetermined portions of subjects.

Here, the screw transfer mechanism using air according to the embodiment of the present invention will be described in detail by contrasting disadvantages of pressure transfer by compressed air according to the related art shown in FIGS. 20 and 21 with suction by a suction device according to the embodiment of the present invention.

As can be seen from an air flow shown by arrows in (c) of FIG. 20, air for pressure transfer causes vortex between a Y-shaped path h and a holder c1 of a fore-end portion. As a result, the number of times screws are stuck or reversed increases. Specifically, all the air supplied for pressure transfer is not discharged from an outlet of a route but the flow of remaining air is reversed between the Y-shaped path h and the holder c1 so as to cause a vortex state. Therefore, a rotation force is applied to screws. For this reason, short screws and light screws may be easily inverted.

Further, as shown in (a) of FIG. 21, as one of method for preventing a screw from being reversed, there has been proposed a configuration in which a screw-reversal preventing mechanism i for preventing a screw reversal in the vicinity of a Y-shaped path h is attached. However, as shown in (b) of FIG. 21, in a screw feed driver unit having the above-mentioned configuration, in a case of a screw in which the length is about twice or more the diameter of the screw head and in a case of a large-sized screw (heavy screw), if each screw transfer tube has an appropriate inner diameter, stable feed is possible. However, in a case of a screw in which the length is about two or less that the diameter of the screw head or in a case of a small-sized screw (light screw), the probability in which the screw gets stuck or is reversed between the Y-shaped path h and a holder c1 remarkably increases.

Therefore, the embodiment of the present invention solves the vortex phenomenon of air occurring between the Y-shaped path h and the holder c1 by changing the screw transfer manner from pressure transfer to suction.

First of all, in the case of pressure transfer, as a method of suppressing a vortex, a method of adjusting an amount of air in order not to cause a vortex is exemplified. However, actually, since there are too many factors for adjustment, such as a variation in the sizes or shapes of individual screws or a variation in the temperature or dew point of supplied air, it is very difficult to appropriately adjust the amount of air.

Meanwhile, when a screw is transferred by suction as in the embodiment of the present invention, an amount of air flowing into the driver is determined by an amount of discharged air of the suction device for suction, which means that no air remains. Therefore, a vortex state of air does not occur. As a result, it becomes possible to transfer a screw in a stable posture.

Since the automatic screw tightening apparatus according to the embodiment of the present invention has the configuration and the action as described above, it has the following advantages.

(1) Since the screw transfer mechanism 3 by air suction from the screw tightening mechanism side transfers a screw S with a screw head portion S1 being in the lead, the screw is less likely to damage the inner wall of the transfer tube 32 and does not get stuck in the transfer tube 32, and it is possible to stabilize the posture of the screw S and firmly engage the screw S with the driver bit and to stably feed the screw, thereby capable of improving the reliability.

Further, it is possible to automatically and quickly tighten the screw engaged with the driver bit 511 against the screwed portion 422 of the subject.

(2) Since the feed head unit 331 corresponding to a plurality of different kinds of screws is provided at the fore end of the rotatable arm 332, it is possible to select a desired kind of screws from the plurality of different kinds of screws and quickly engage the desired kind of screws with the driver bit. Further, since it is possible to feed the desired kind of screws to the driver bit only by controlling the rotation position of the feed head unit, the configuration is simple and maintenance is easy.

It will be apparent to those skilled in the art that various modifications and changes may be made without departing from the scope and spirit of the invention. For example, although two feed head parts are used in the embodiment, three or more feed head parts may be provided to the rotatable arm 332 as long as the feed head units can be aligned with the driver bit portion 51. Therefore, it should be understood that the above embodiment is not limitative, but illustrative in all aspects. The scope of the invention is defined by the appended claims rather than by the description preceding them, and therefore all changes and modifications that fall within metes and bounds of the claims, or equivalents of such metes and bounds are therefore intended to be embraced by the claims.

What is claimed is:

1. An automatic screw tightening apparatus that transfers a screw from a screw feeding mechanism to a screw tightening mechanism by a screw transferring mechanism using air suction of the screw tightening mechanism, engages the screw with a driver bit portion of a fore end of the screw tightening mechanism, and tightens the screw against a predetermined screwed portion, and comprising:
   a discharging unit (33) at a fore end of a transfer tube (32) from the screw feeding mechanism (3),
   a rotatable arm 332) rotatably mounted upon the screw tightening mechanism (4, 5),
   a feed head unit (331) mounted upon a fore end of the rotatable arm (332) to be brought into close contact with a driver bit (51) of a fore end of the screw tightening mechanism (4, 5), and
   at least one connection pipe (336) mounted upon the rotatable arm (332) to rotate with the same and coupled at one end to the discharging unit (33) and at an opposite end to the feed head unit (331),
   the feed head unit (331) being movable between a close contact with the driver bit (51) at the fore end of the screw tightening mechanism (4, 5) and an evacuation position where the feed head unit (331) is spaced from the driver bit (51), and
   at the close contact position, the driver bit (51) at the fore end of the screw tightening mechanism (4, 5) is brought into contact with the screw (S) and sucks a head portion (S1) of the screw (S) to engage the screw (S).

2. The automatic screw tightening apparatus according to claim 1, comprising:
   a plurality of feed head parts (331a, 331b) corresponding to different kinds of screws (S) in the feed head unit (331) at the fore end of the rotatable arm (332), with a predetermined feed head part (331a, 331b) being selected and brought into contact with the driver bit (51) to feed different kinds of screws (S) to the feed head part (331).

3. The automatic screw tightening apparatus according to claim 2, comprising:
   a bent passage (335) in each said feed head part (331a, 331b) and coupled at one end thereof to a respective connection pipe (336) in turn mounted to rotate with the rotatable arm (332).

4. The automatic screw tightening apparatus according to claim 3, wherein the feed head parts (331a, 331b) comprise:
   a guide block (3314) in turn comprising splittable guide block components (3314a, 3314b) arranged to be joined together and form the guide block (3314), and
   a guide groove (3315) in each said guide block component (3314a, 3314b) and arranged to form said bent passage (335) when said guide block components (3314a, 3314b) are joined together.

5. The automatic screw tightening apparatus according to claim 1, wherein said rotatable arm (332) is rotatably mounted upon the screw tightening mechanism (4, 5) on a shaft (333, x1) located on a base portion (337) of the screw tightening mechanism (4, 5) at a point between the discharging unit (33) and the feed head unit (331),
   with the discharging unit (33) and the feed head unit (331) both mounted upon the rotatable arm (332) to rotate with the same.

6. The automatic screw tightening apparatus according to claim 1, wherein the feed head unit (331) comprises a bent passage (335) coupled at one end to the connection pipe (336).

7. The automatic screw tightening apparatus according to claim 6, wherein the bent passage comprises and approximately 90° elbow.

8. The automatic screw tightening apparatus according to claim 5, wherein the feed head unit (331) comprises a bent passage (335) coupled at one end to the connection pipe (336).

9. The automatic screw tightening apparatus according to claim 8, wherein the bent passage comprises and approximately 90° elbow.

10. The automatic screw tightening apparatus according to claim 1, wherein the discharging unit (33) comprises a connection unit (3381) in turn having a screw feeding port (338) in turn coupled to the transfer tube (32) from the screw feeding mechanism (3) and being coaxially arranged with respect to the rotatable arm (332).

11. The automatic screw tightening apparatus according to claim 10, wherein the connection unit (3381) comprises:
   a guide block (3382) in turn comprising splittable guide block components (3382a, 3382b) arranged to be joined together and form the guide block (3382), and
   a guide groove in each said guide block component (3382a, 3382b) and arranged to form a bent passage communicating the transfer tube (32) and connection pipe (336) when said guide block components (3382a, 3382b) are joined together.

12. The automatic screw tightening apparatus according to claim 5, wherein the base portion (337) is mounted to be vertically movable on the screw tightening mechanism (4, 5).

13. The automatic screw tightening apparatus according to claim 1, additionally comprising
   a driven pulley (3331) upon which the rotatable arm (332) is mounted and in turn mounted upon a base portion (337) of the screw tightening mechanism (4, 5),
   a motor (335) mounted upon the base portion (337) and coupled to a drive pulley (3351), and a belt (334) wrapped around both the drive and driven pulleys (3351, 3331).

\* \* \* \* \*